US009094859B2

(12) United States Patent
Khalil et al.

(10) Patent No.: US 9,094,859 B2
(45) Date of Patent: Jul. 28, 2015

(54) SMALL CELL CONFIGURATION AND MAINTENANCE IN MOBILE TERMINALS

(71) Applicant: Futurewei Technologies, Inc., Plano, TX (US)

(72) Inventors: Mohamed Khalil, Murphy, TX (US); Baoling S Sheen, Naperville, IL (US); James Mathew, Ballemead, NJ (US); Chin Chiu, Allen, TX (US)

(73) Assignee: Futurewei Technologies, Inc., Plano, TX (US)

(*) Notice: Subject to any disclaimer, the term of this patent is extended or adjusted under 35 U.S.C. 154(b) by 0 days.

(21) Appl. No.: 14/575,739

(22) Filed: Dec. 18, 2014

(65) Prior Publication Data

US 2015/0105068 A1    Apr. 16, 2015

Related U.S. Application Data

(62) Division of application No. 13/492,000, filed on Jun. 8, 2012, now Pat. No. 8,948,740.

(51) Int. Cl.
    *H04W 24/00* (2009.01)
    *H04W 24/04* (2009.01)
    *H04W 88/08* (2009.01)

(52) U.S. Cl.
    CPC .............. *H04W 24/04* (2013.01); *H04W 88/08* (2013.01)

(58) Field of Classification Search
    CPC ..... H04W 24/04; H04W 88/08; H04W 24/00; H04W 24/08; H04W 24/02; H04B 17/0042
    USPC ................ 455/560, 445, 561, 402, 433, 424; 370/330, 484, 336, 350; 375/219, 260, 375/257
    See application file for complete search history.

(56) References Cited

U.S. PATENT DOCUMENTS

| | | | |
|---|---|---|---|
| 2003/0058827 A1* | 3/2003 | Chow et al. ................... | 370/338 |
| 2005/0132231 A1* | 6/2005 | Williamson et al. .......... | 713/201 |
| 2006/0112384 A1* | 5/2006 | Frank et al. ................... | 717/168 |
| 2008/0009286 A1* | 1/2008 | Hur et al. .................. | 455/435.1 |
| 2008/0045218 A1* | 2/2008 | Okochi et al. ................ | 455/436 |
| 2008/0267114 A1* | 10/2008 | Mukherjee et al. ........... | 370/315 |
| 2009/0047945 A1* | 2/2009 | Zhang et al. .................. | 455/424 |
| 2009/0195363 A1* | 8/2009 | Downie et al. ............... | 340/10.4 |
| 2009/0207773 A1* | 8/2009 | Feng et al. ..................... | 370/312 |
| 2010/0128709 A1* | 5/2010 | Liu et al. ....................... | 370/338 |
| 2012/0100847 A1* | 4/2012 | Rahman ........................ | 455/424 |

* cited by examiner

*Primary Examiner* — Mahendra Patel

(57) ABSTRACT

The claimed subject matter is directed to defining a framework that enables wireless communicability between base stations for maintenance and configuration purposes, even while disconnected from an operator network, and/or deployed in the field. Embodiments are particularly applicable in the cases of small-cell base transceiver stations deployed in inconvenient, secluded, elevated and/or difficult to reach locations. The small cell base transceiver station is operable to communicate wirelessly to wireless terminals and mobile computing devices by emulating select functionality from dedicated components in an operator network.

18 Claims, 6 Drawing Sheets

SMALL CELL CONFIGURATION AND MAINTENANCE IN MOBILE TERMINALS

CROSS REFERENCE TO RELATED APPLICATIONS

This application is a divisional of U.S. application Ser. No. 13/492,000 to Khalil et al., filed Jun. 8, 2012, which is incorporated by reference herein in its entirety and for all purposes.

TECHNICAL FIELD

The claimed subject matter pertains to the maintenance and configuration of base transceiver stations. In particular, it provides mechanisms for wirelessly accessing maintenance and configuration terminals of small cell base transceiver stations, even when deployed in the field and/or offline and disconnected from an operator network.

BACKGROUND

Wireless data communications are a critical component of mobile computing and have become increasingly popular due to the continued development of mobile computing technologies and the deployment of massive infrastructures. Typical wireless communication systems may be multiple access systems capable of supporting communication with multiple users by sharing available system resources (e.g., bandwidth, transmit power, etc.) Examples of such multiple access systems may include code division multiple access (CDMA) systems, high speed packet access (HSPA), wideband code division multiple access (W-CDMA) systems, time division multiple access (TDMA) systems, frequency division multiple access (FDMA) systems, orthogonal frequency division multiple access (OFDMA) systems, among others. Additionally, the systems can conform to specifications such as third generation partnership project 3GPP, 3GPP long term evolution (LTE), ultra mobile broadband (UMB), etc.

Generally, wireless multiple access communication systems may support simultaneous communication for multiple mobile devices in a network. Each mobile device may communicate with an operator network (e.g., a cellular network), other mobile devices, by connecting to one or more access points (e.g., base stations, relay nodes, etc) of the network via radio frequency (RF) transmissions. The various available technologies that comprise the spectrum of wireless data communications often differ in local availability, coverage range and performance. Cellular networks are one type of wireless data network, where wireless service is provided over a geographical area, and this service area is divided into a number of smaller (sometimes overlapping) regions known as cells. Each cell is served by at least one fixed-location transceiver known as a cell site, base station, or base transceiver station (BTS). Individual nodes are also commonly referred to as nodes, node base stations ("node Bs"), or eNB ("enhanced node base stations"). When joined together, the network provided by these cells, stations, and/or nodes can cover a significantly wide area. This enables a large number of user-operated mobile computing devices (e.g., mobile phones, tablets, laptops, etc.) to communicate to other nodes in the network via the base stations.

Conventionally, the equipment comprising the cell sites and base stations may be co-located with antennas and assorted electronic communications equipment, and usually combined with a radio mast, tower or other high place, for better radio coverage in a cellular network. The elevated structure may include antennas, and one or more sets of transmitter/receivers, transceivers, digital signal processors, control electronics, GPS receivers, primary and backup electrical power sources, and sheltering. The combined appearance of so much technological equipment is often considered unnatural, conspicuous, and/or aesthetically displeasing. Accordingly, some cities require that cell sites be inconspicuous, for example blended with the surrounding area. One solution is to create modified treescapes by hiding cell towers inside an artificial tree or preserved tree.

Even more recently, base transceiver station units have been developed which are much smaller in size than traditional base station units. These units, referred to as small cells, or small cell base stations, have both an improved appearance (e.g., are less conspicuous), and, due to their size, may be co-located with other small cells to provide greater service in dense, urban areas. Where the size of traditional base station units limit their location to on or near ground level, the reduced size of small cells also allow small cell units to be deployed with or on pre-existing, elevated city structures, such as traffic lights, lampposts, building corners, etc, thereby eliminating the need for a cell tower.

However, being deployed at elevated locations prevents maintenance, repair, and post-deployment configuration from being performed easily, especially when a connection to the operator network cannot be utilized, e.g., when the base station is disconnected from the operator network, or a connection is malfunctioning or configured incorrectly. In such instances, because a remote computing device would no longer be able to access the base transceiver station through the network, a service technician or maintenance engineer would be required to physically connect to the base transceiver station (e.g., through a cable), to be able to perform any kind of repair or diagnosis, typically through the local maintenance terminal (LMT) of the base transceiver station. Whereas traditional base stations located at or near ground level may be configured by physically coupling a mobile maintenance device (such as a laptop or smartphone, etc.) to a port in the base station and accessing the LMT with relative ease, the often-elevated deployment of small-cell base stations can make physically connecting a maintenance device in order to access the LMT difficult and/or dangerous, often requiring specialized equipment (ladders, forklifts, etc.), and additional time to procure the equipment and for an engineer or maintenance technician to create the physical connection. This may result in further delays and increased capital and operational expenses in the maintenance, configuration, and repair of small-cell base transceiver stations deployed in the field.

SUMMARY

As a solution to the type of problems noted above, this disclosure provides novel methods and systems for drastically reducing capital and operation costs in the maintenance, initialization, and configuration of small-cell base transceiver stations deployed in the field. The reduced costs are provided through the use of emulated network components comprised in the small-cell base transceiver, and operable to establish and facilitate wireless access to a local maintenance terminal in the base transceiver station.

In an embodiment, a method and apparatus is provided to grant wireless access to authenticated user equipment devices to a local maintenance terminal in a base transceiver station without going through an operator network. According to these embodiments, specific, down-scaled functionalities of hardware components in an operator network may be emulated in the base transceiver station to facilitate wireless connections and data transmission. These functionalities include selected functionalities from a Mobile Management Entity (MME), a Serving Gateway (SGW), a Packet Gateway (PGW), and a Home Subscriber Server (HSS).

According to other embodiments, a method is provided to configure and perform maintenance operations for a base transceiver station through a graphical user interface of an authenticated mobile computing device. According to these embodiments, the mobile computing device determines the network type (e.g., maintenance network) of a base transceiver station according to one of two mechanisms: 1) through the utilization of access classes, as proposed by 3GPP, and/or 2) through the use of specific Public Land Mobile Networks (PLMNs) corresponding to the base transceiver station.

BRIEF DESCRIPTION OF DRAWINGS

The accompanying drawings, which are incorporated in and form a part of this specification, illustrate embodiments of the disclosure and, together with the description, serve to explain the principles of the presently claimed subject matter:

DETAILED DESCRIPTION

Figure 1:
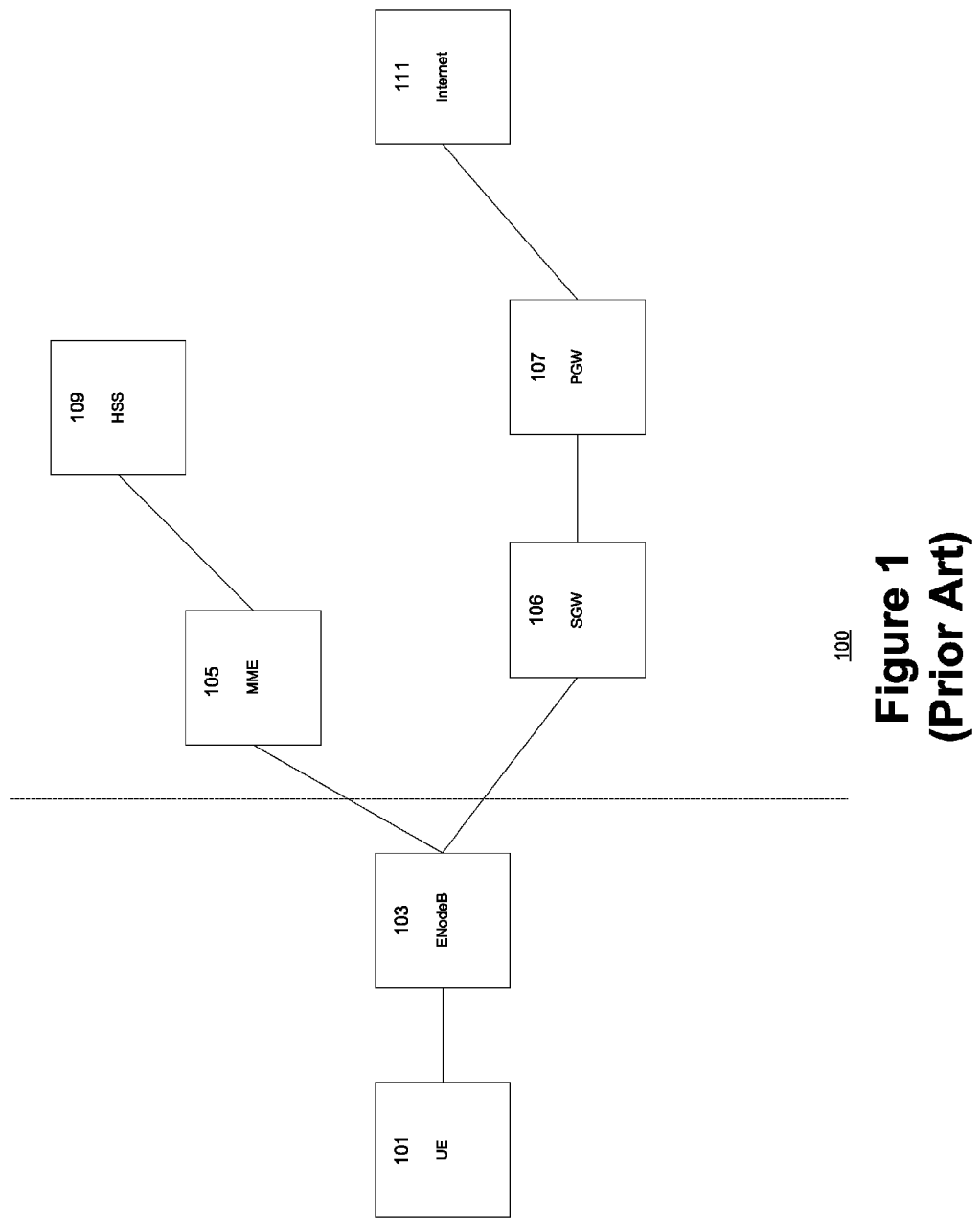
FIG. 1 depicts a block diagram of a traditional architecture for a system for wireless data communications over a cellular data network.

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternative, modifications, and equivalents, which may be included within the spirit and scope of the claimed subject matter as defined by the appended claims.

Portions of the detailed description that follow are presented and discussed in terms of a process. Although operations and sequencing thereof are disclosed in a figure herein (e.g., FIGS. 5 and 6) describing the operations of this process, such operations and sequencing are exemplary. Embodiments are well suited to performing various other operations or variations of the operations recited in the flowchart of the figure herein, and in a sequence other than that depicted and described herein.

As used in this application the terms component, module, system, and the like are intended to refer to a computer-related entity, specifically, either hardware, firmware, a combination of hardware and software, software, or software in execution. For example, a component can be, but is not limited to being, a process running on a processor, an integrated circuit, an object, an executable, a thread of execution, a program, and or a computer. By way of illustration, both an application running on a computing device and the computing device can be a component. One or more components can reside within a process and/or thread of execution, and a component can be localized on one computer and/or distributed between two or more computers. In addition, these components can be executed from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various aspects are described herein in connection with a mobile computing device and/or a base transceiver station. A mobile computing device can refer to a device providing voice and or data connectivity to a user. A mobile computing device can be—or can be connected to—a computing device, such as a laptop computer or desktop computer, or it can be a self contained device such as a smartphone or personal digital assistant (PDA). A mobile computing device can also be called a user device or user equipment (UE). A base transceiver station (BTS) may also be referred to as an access point, node B, enhanced Node B (eNB), and can refer to a device in an access network that communicates over the air interface through one or more sectors with mobile computing devices. The base transceiver station can act as a router between a mobile computing device and the rest of the operator network which can include an Internet Protocol (IP) network by converting received air interface signals to IP packets.

Various techniques described herein can be used for various wireless communication systems, such as Code Division Multiple Access (CDMA) systems, Time Division Multiple Access (TDMA) systems, Frequency Division Multiple Access (FDMA) systems, Orthogonal Frequency Division Multiple Access (OFDMA) systems, Single Carrier FDMA (SC FDMA) systems, etc. The terms "system" and "network" may be used herein interchangeably. A CDMA system can implement a radio technology, such as Universal Terrestrial Radio Access (UTRA, CDMA2000, etc.). UTRA may include Wideband CDMA (W-CDMA) and other variants of CDMA. A TDMA system may implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, etc. UTRA and E-UTRA are part of Universal Mobile Telecommunication System (UMTS). 3GPP Long Term Evolution (LTE) uses E-UTRA which employs OFDMA on the downlink and SC-FDMA on the uplink. UTRA, E-UTRA, UMTS, LTE, and GSM are described in documents from an organization named 3rd Generation Partnership Project 3GPP. CDMA2000 and UMB are described in documents from an organization named 3rd Generation Partnership Project 2 3GPP2

FIG. 1 depicts a block diagram 100 of a traditional architecture for a system for wireless data communications over a cellular data network. For illustrative purposes, the architecture of the evolved packet core (EPC), a network architecture for the LTE wireless communication standard is presented. As shown, a user equipment (UE) 101, such as mobile computing device or wireless terminal, may connect to an operator network via a base transceiver station ("eNB") 103, which acts as a router or gateway to the operator network. The operator network facilitates and manages connections to individual UEs, and other nodes through various subcomponents of the EPC including the Mobile Management Entity (MME) 105, the Serving Gateway (SGW) 106, the Packet Data Network Gateway (PGW) 107, and Home Subscriber Server (HSS) 109. Interactions among and between the UE, eNB, and sub components of the EPC are further performed to grant a UE 101 access to the internet 111.

The MME 105 is the key control-node for the LTE access-network, and performs numerous functions. Among its functions, the MME is responsible for the bearer activation/deactivation process and is also responsible for choosing the SGW for a UE at the initial attach. The MME is responsible for authenticating the user (by interacting with the HSS). The MME is also responsible for generation and allocation of temporary identities to UEs. The MME may determine authorization of the UE to camp on the service provider's Public Land Mobile Network (PLMN) and enforces UE roaming restrictions. The MME is also the termination point in the network for ciphering/integrity protection for NAS signaling and handles the security key management.

The SGW 106 routes and forwards user data packets. Among its duties, the SGW manages and stores UE contexts, e.g. parameters of the IP bearer service, network internal routing information. The PGW 107 provides connectivity from the UE to external packet data networks by being the point of exit and entry of traffic for the UE. Among its duties, the PGW performs policy enforcement, packet filtering for each user, charging support, lawful interception and packet screening. The HSS 109 is a central database that contains user-related and subscription-related information. The functions of the HSS include functionalities such as mobility management, call and session establishment support, user authentication and access authorization.

Typically, one or more of the MME, SGW, PGW, and HSS are implemented as dedicated hardware components or a combination of hardware and software components executing in an EPC of an operator network. However, access to the network (and by extension, the Internet 111) would be possible to a base transceiver station and any connected mobile computing devices only when the connection between the base transceiver station and the EPC: 1) exists, 2) is configured properly, and 3) is working as intended. If no connection is established (e.g., due to a link failure, or before initial configuration is performed), or, if the base transceiver station is misconfigured or malfunctioning, then not only is access to the operator network for both the base transceiver station and any accompanying UEs compromised, even performing remote maintenance or reconfiguration may be prevented as well. Under such instances, a costly, dangerous, and/or time intensive maintenance or configuration session must be performed manually, typically by deploying a service technician or maintenance engineer on-site.

Figure 2:
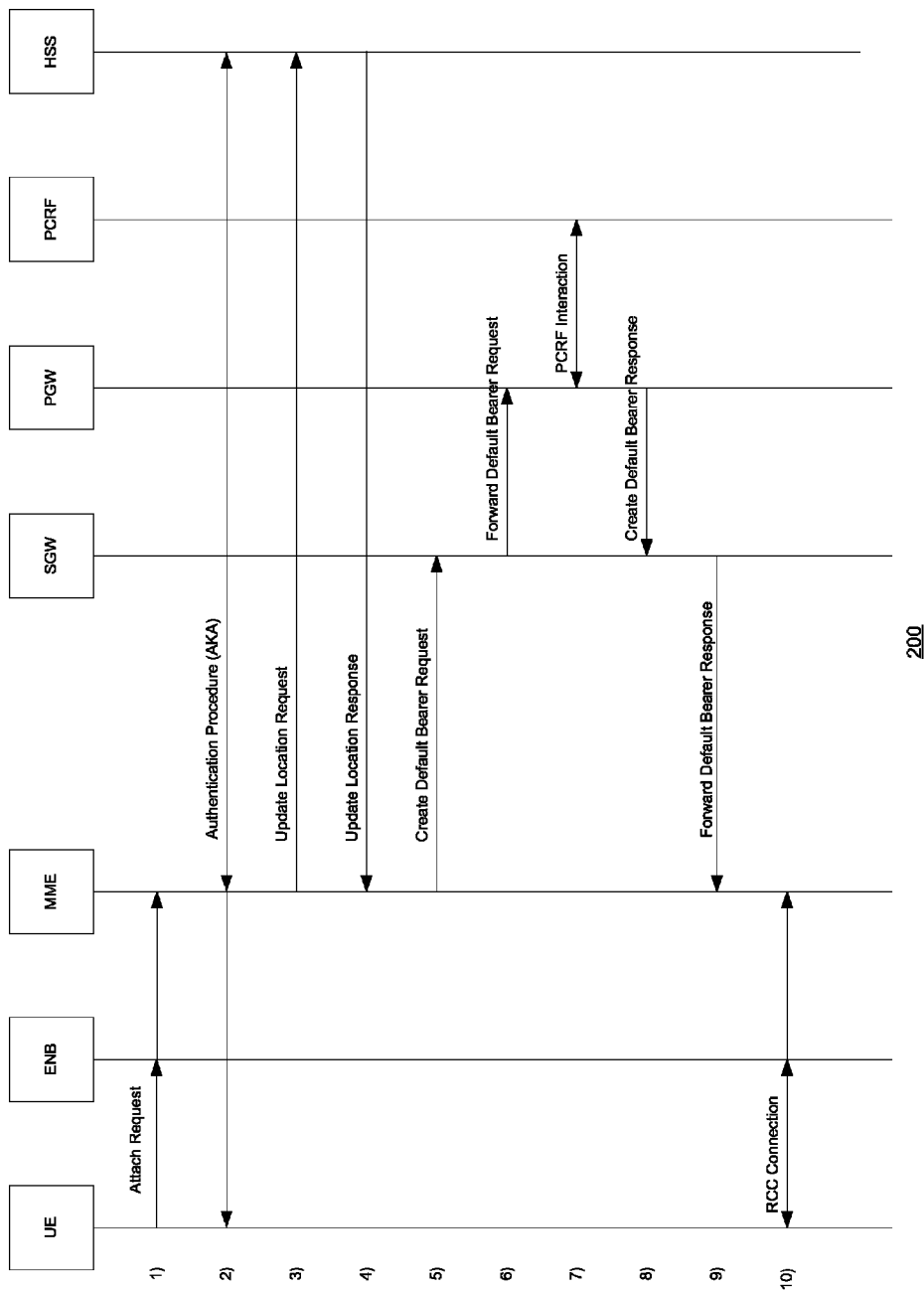
FIG. 2 depicts a data flow diagram of a process for initiating wireless data transmission between a mobile computing device and a base transceiver station of a traditional system for wireless data communications over a cellular data network.

Likewise, due to the incorporation of the various components, any attempts to connect to the operator network from a UE and through a base transceiver station (such as a small cell) typically involves a lengthy and complex process in conventional systems for providing wireless data communication over a cellular data network. FIG. 2 depicts a data flow diagram 200 for such a process of attaching a UE to an operator network. As presented in FIG. 2, at Time 1), an attach request is submitted from a UE to a base transceiver station, which is then forwarded on to an MME of the operator network. The attach process itself may include repeated interactions between the three parties, including identity requests and responses. Once an identity is established for the UE, an Authentication process (e.g., AKA process) is performed between the MME and HSS at time 2) to authenticate the UE for communication on the operator network. Following, location requests, and responses between the MME and HSS are performed at times 3) and 4), respectively. Subsequently at time 5), a request to create a default bearer is submitted from the MME to the SGW, and forwarded, at 6) on to the PGW.

The PGW may interact with a Policy Charging and Rules Function (PCRF) node at time 7). The response is received in the SGW at time 8) and forwarded to the MME at time 9), all of which must be performed before a connection complying with the Radio Resource Control (RRC) protocol can be established between the UE, eNB, and MME at time 10).

In contrast, the claimed subject matter is directed to defining a framework that enables wireless communicability between base stations for maintenance and configuration purposes, even while disconnected from an operator network, and/or deployed in the field. Embodiments are particularly applicable in the cases of small-cell base transceiver stations deployed in inconvenient, secluded, elevated and/or difficult to reach locations. The small cell base transceiver station is operable to communicate wirelessly to wireless terminals and mobile computing devices by emulating select functionality from dedicated components in an operator network.

Figure 3:
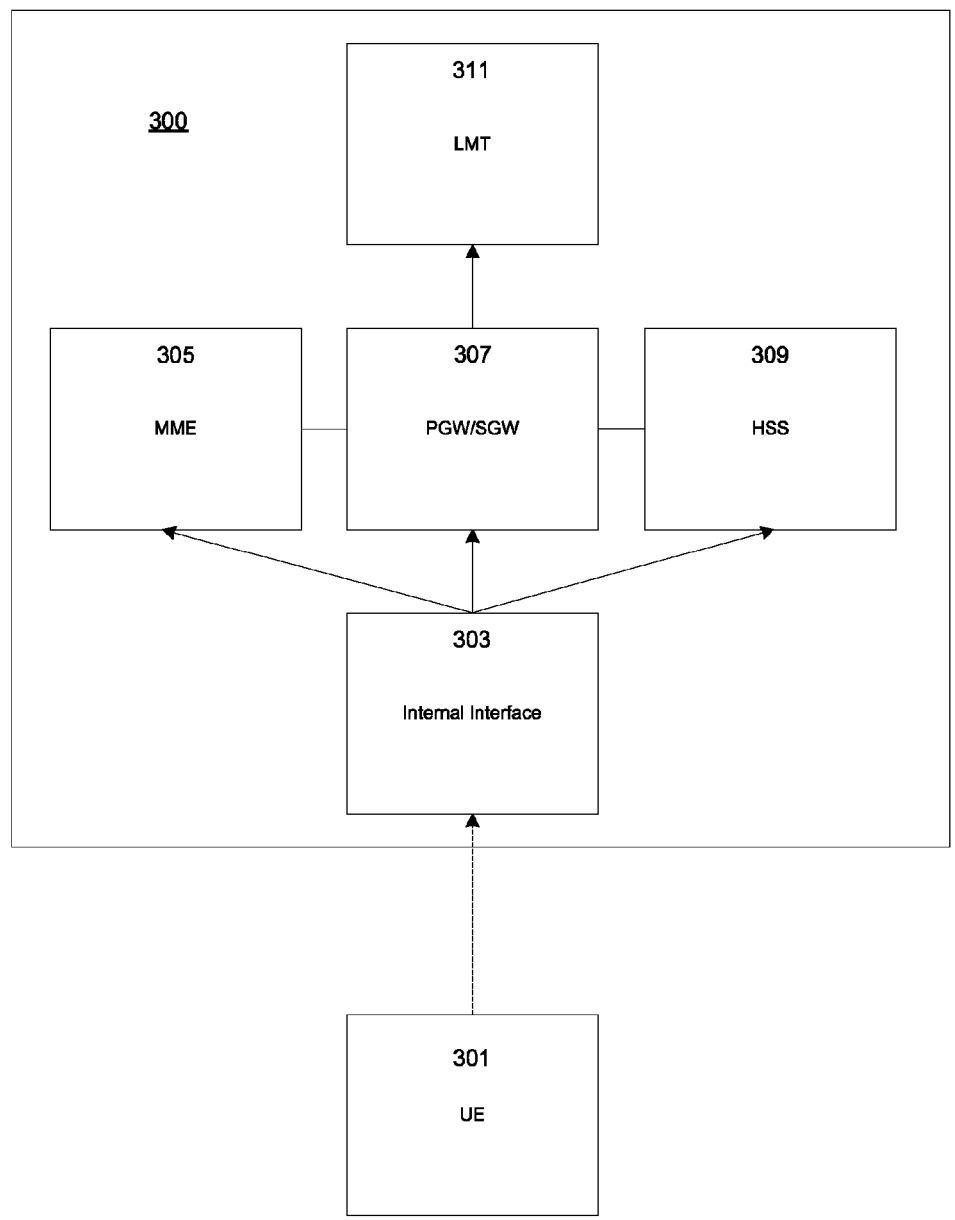
FIG. 3 depicts a block diagram of a small-cell base transceiver station, in accordance with embodiments of the present disclosure.

FIG. 3 depicts a block diagram of a base transceiver station 300, in accordance with embodiments of the present disclosure. In an embodiment, the base transceiver station may be implemented as a small-cell base transceiver station. In still further embodiments, the small-cell base transceiver station may be deployed in the field at difficult and/or inconvenient locations to reach. As depicted in FIG. 3, a base transceiver station or eNB 300 may include an internal interface 303 which receives wireless communication data from a mobile computing device 301 and facilitates interactions between the mobile computing device 301 and the local maintenance terminal (LMT) 309 by distributing the data communication to various emulated components of the EPC contained in the base transceiver station. These emulated components may, for example, include an emulated Mobile Management Entity (MME) 305, an emulated Serving Gateway (SGW) and Packet Gateway (PGW) 307, and an emulated Home Subscriber Server (HSS) 309.

In an embodiment, only partial or selected functionality performed by respective EPC components in an operator network may be implemented in the base transceiver station. In an embodiment, the partial functionality required is to generate a default bearer for connectivity for the eNB component to the LMT. More specifically, the functionality required to accept and facilitate maintenance connections may be implemented in the base transceiver station. Thus, for example, the MME emulator may be operable to perform functionality corresponding to activating a UE as a default bearer. Among LTE systems, an "Evolved Packet System Bearer" or simply "bearer" is a virtual connection between a UE and a PGW which identifies the data sent and received between these two end points with specific Quality of Service (QoS) attributes. The procedure used to establish a bearer is called the "Bearer Activation" procedure, and either endpoint can trigger this procedure. One bearer is established when the UE connects to a PGW, and that remains established throughout the lifetime of the PGW connection to provide the UE with continuous IP connectivity to that PGW. That bearer is referred to as the default bearer. In an embodiment, throughout the performance of maintenance and/or configuration operations, the UE of the user (such as a service technician or maintenance engineer) would be designated as the default bearer.

The MME emulator may also perform functions corresponding to establishing a connection between a UE and the eNB. These functions include, for example, Attach Request, Attach Accept, and Attach Complete. Typically, prior to being granted access to the core network, mobile computing devices must be authenticated with an underlying core network upon initiating communications with an access point (base transceiver station). This authentication can include communicating with the operator network via an authentication and key agreement (AKA), non-access stratum (NAS) and/or access stratum (AS) security mode command (SMC), etc. According to embodiments of the claimed subject matter, these authentication procedures may also be performed by the MME emulator for the UE.

In an embodiment, the PGW and SGW emulator 307 may be configured to offer an IP address in the local network associated with the default bearer, in order to access the local maintenance terminal of the corresponding eNB. Finally, the HSS emulator may be configured to provide one AKA vector during the authentication procedure performed by the MME. In an embodiment, the AKA vector must match a similar vector in the UE, either pre-installed, or available on a separate subscriber identity module (SIM) used by the UE.

According to various embodiments, each of the MME, PGW/SGW, and HSS emulators may be implemented as specific hardware components comprised locally in the eNB unit, as software executed by the eNB unit, or a combination of hardware and software components. By emulating these specific functions, the advantages of reduced size in a small-cell eNB need not be materially affected, while the ability to wirelessly connect to a eNB for maintenance and configuration purposes may be provided, even while the eNB is disconnected from or otherwise inaccessible by an operator network.

Figure 4:
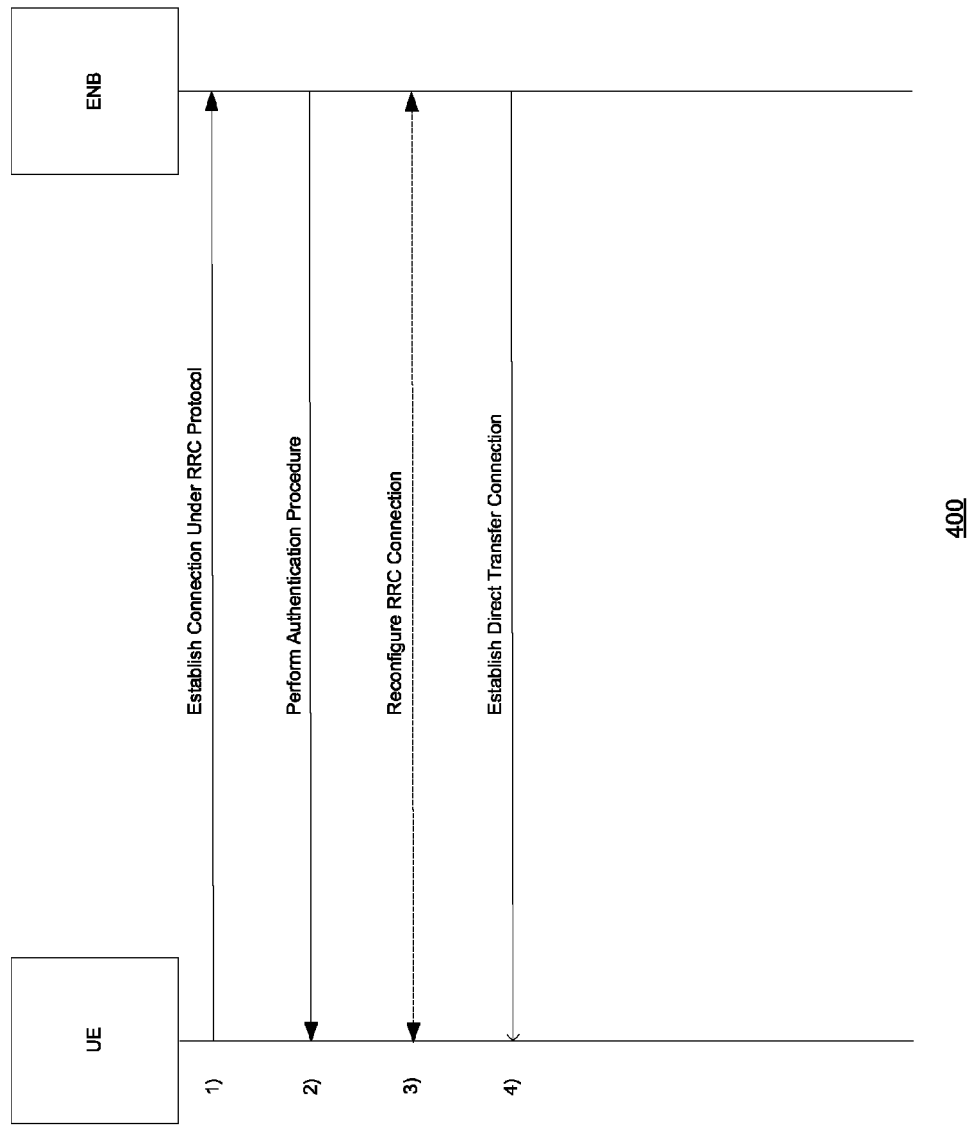
FIG. 4 depicts a data flow diagram of a process for initiating wireless data transmission between a mobile computing device and a base transceiver station, in accordance with embodiments of the present disclosure.

By emulating certain functionalities of operator network components in the eNB itself, the attach procedure for a UE can also be streamlined. FIG. 4 depicts an exemplary data flow diagram 400 for such a process. As presented in FIG. 4, at Time 1), a connection under the Radio Request Connection protocol is initiated. This connection typically includes generating and transmitting an attach request at time 1). Upon receiving the attach request in the eNB, an Authentication Procedure (e.g., AKA, NAS SMC, or AS SMC) is performed at time 2). Once the UE is authenticated as an authorized maintenance device, the RRC connection is reconfigured (e.g., an IP address is allocated for the maintenance device) at time 3), whereupon a direct transfer connection between the UE and the eNB (and the local maintenance terminal of the eNB) is established at time 4).

Figure 5:
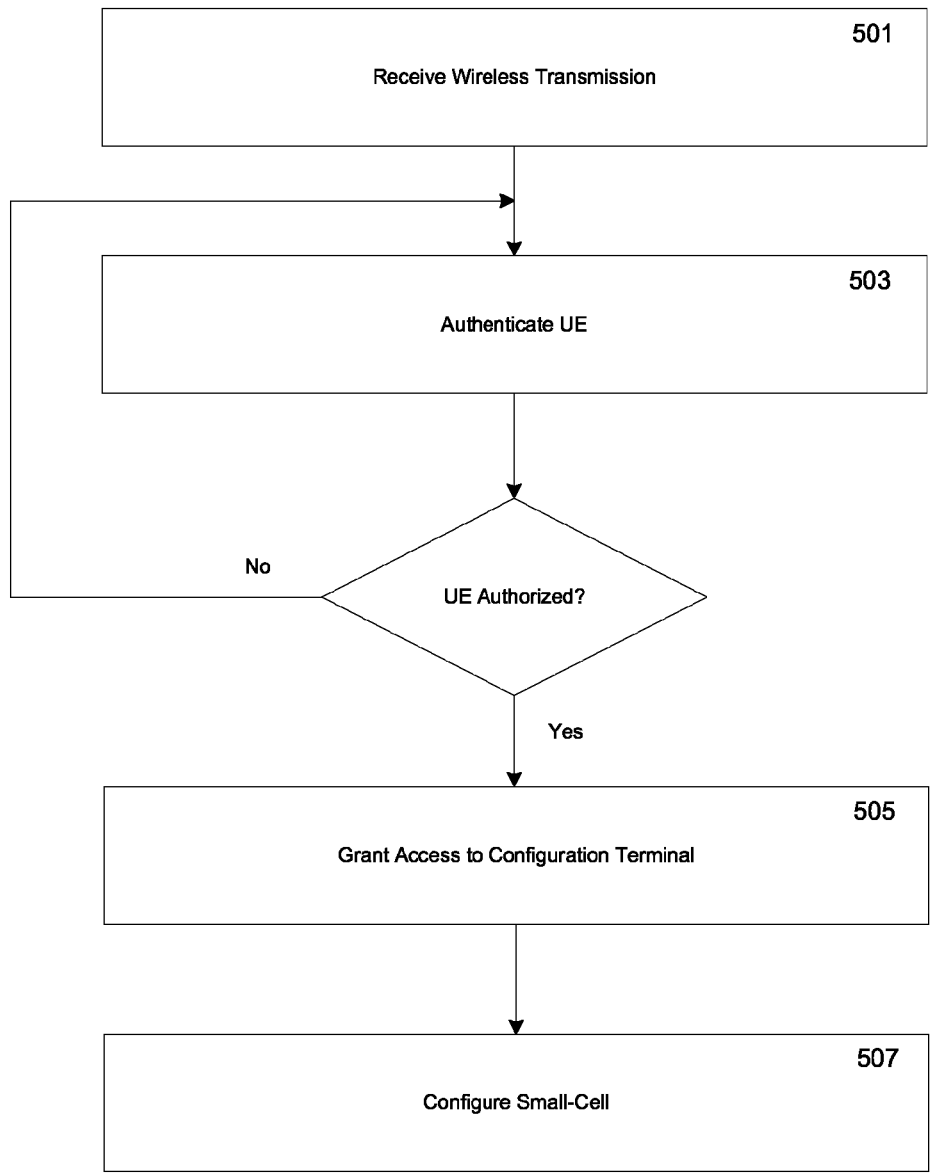
FIG. 5 depicts a flowchart of a process for wirelessly configuring a base transceiver station, in accordance with embodiments of the present disclosure.

FIG. 5 depicts a flowchart 500 of a process for wirelessly configuring a base transceiver station, in accordance with embodiments of the present disclosure. Steps 501 to 507 describe exemplary steps comprising the process 500 depicted in FIG. 5 in accordance with the various embodiments herein described. In one embodiment, the process 500 is implemented in whole or in part as computer-executable instructions stored in a computer-readable medium and executed by a processor processing unit in a base transceiver station.

At step 501, a wireless transmission from a mobile computing device is received in a base transceiver station. In an embodiment, the wireless transmission request comprises an attach request and/or an connection establishment attempt according to the RRC protocol. In an embodiment, the wireless transmission may consist of communication transmitted over cellular frequencies. Alternatively, the wireless transmission may consist of communication transmitted over Wi-Fi or any other Radio Frequency standards. In an embodiment, the base transceiver station comprises a small-cell base transceiver station deployed in the field and disconnected from and/or inaccessible via an operator network. In still further embodiments, the wireless transmission comprises a wireless communication from the mobile computing device of a maintenance engineer or service technician deployed to repair or initialize the connection between the eNB and an operator network, to reconfigure the data settings of the eNB, to perform maintenance on the eNB, and/or to perform monitoring or diagnostics on the eNB. In yet further embodiments, the wireless transmission may be received in the internal interface and/or an MME emulator comprised in the eNB.

At step 503, the UE is authenticated. Authentication may be performed in whole or in part, by the MME emulator, a SGW/PGW emulator and an HSS emulator comprised in the eNB. Authentication may include an AKA procedure, an AKA procedure performed with AKA vectors, an AS SMC procedure, and/or an NAS SMC procedure. If authentication fails, the process repeats steps 501 through 503 until an authentication is successful, whereupon the process proceeds to step 505.

At step 505, once authenticated at step 503, the requesting mobile computing device is granted access to the local maintenance terminal (LMT) of the eNB. In an embodiment, various functions of eNB maintenance and configuration may be performed by accessing the LMT. These functions may include, but are not limited to, tuning configuration parameters of the eNB; generating a summary view of any critical alarms corresponding to the eNB; performing real-time performance monitoring of the eNB; managing software of the eNB; and managing self-check and self-diagnostic processes performed by the eNB. In further embodiments, the eNB may correspond to a plurality of regions, such as the local working zone or immediate geographic area surrounding the eNB. According to such embodiments, the summary view may alert the user to any critical alarms which have been triggered within the local working zone, the immediate geographic area, or any other small-cell or other base transceiver stations within a certain proximity of the eNB. Real time performance monitoring may comprise, for example, monitoring the performance corresponding to the eNB or individual components of the eNB. Managing software of the BTS may comprise, for instance, checking software version history, and initiating software download, installation, and activation.

In an embodiment, functionality available to a UE through the LMT may be presented to a user of the UE in a graphical user interface displayed on the UE. Configuration and maintenance operations, parameters, and settings may be submitted by the user through the user interface, with which the eNB may be configured at step 507.

Figure 6:
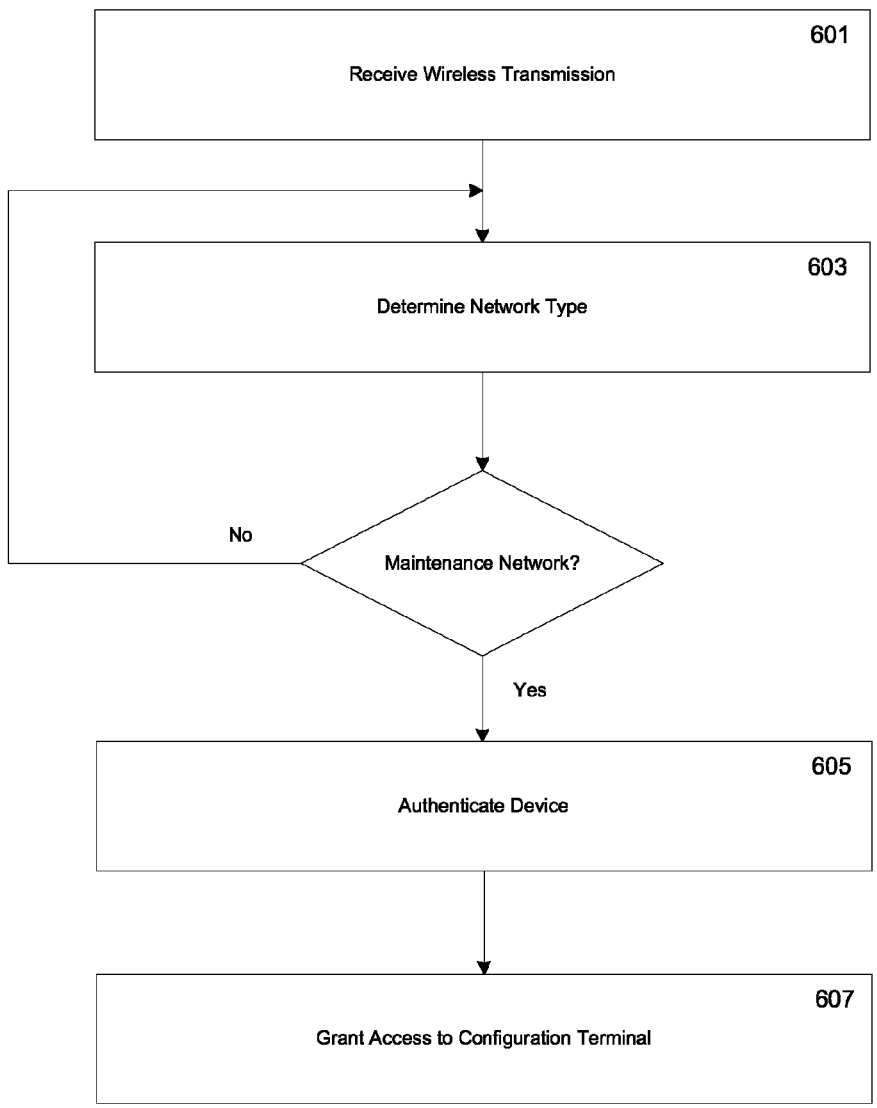
FIG. 6 depicts a flowchart of a process for configuring a base transceiver station through a configuration terminal, in accordance with embodiments of the present disclosure.

FIG. 6 depicts a flowchart 600 of a process for configuring a base transceiver station through a configuration terminal, in accordance with embodiments of the present disclosure. Steps 601 to 607 describe exemplary steps comprising the process 600 depicted in FIG. 6 in accordance with the various embodiments herein described. In one embodiment, the process 600 is implemented in whole or in part as computer-executable instructions stored in a computer-readable medium and executed by a processor processing unit in a base transceiver station.

At step 601, a wireless transmission is transmitted from a mobile computing device at a base transceiver station. In an embodiment, the wireless transmission request comprises an attach request and/or an connection establishment attempt according to the RRC protocol. In an embodiment, the base transceiver station comprises a small-cell base transceiver station deployed in the field and disconnected from and/or inaccessible via an operator network. In still further embodiments, the wireless transmission comprises a wireless communication from the mobile computing device of a maintenance engineer or service technician deployed to repair or initialize the connection between the eNB and an operator network, to reconfigure the data settings of the eNB, to perform maintenance on the BTS, and/or to perform monitoring or diagnostics on the eNB. In yet further embodiments, the wireless transmission may be received in the internal interface and/or an MME emulator comprised in the eNB.

At step 603, the network type with respect to the LMT of the eNB as a maintenance network is determined. According to embodiments, a UE may perform configuration and maintenance operations for a eNB only when connected to the local maintenance network of the eNB. Determination of the network type as a maintenance network may be performed according to various embodiments. According to a first embodiment, the eNB may correspond to a plurality of networks, including a specific maintenance network for performing maintenance operations. The plurality of networks may be registered as Public Land Mobile Networks (PLMNs) and be correspondingly identified. The network type of a eNB may be identified as a maintenance network by the UE by providing identification data (e.g., a mobile country code and/or a mobile network code) corresponding to the maintenance network. Accordingly, the UE may submit authentication data, as requested by any authentication procedures executed by the eNB prior to proceeding to step 605.

Alternatively, the network type of a eNB may be determined by utilizing a plurality of access classes. According to these embodiments, wireless transmissions may be classified according to a plurality of access classes. Transmissions between an authorized mobile computing device (UE) and an eNB for maintenance or configuration purposes may be classified as a specific access class, and be granted exclusive access to the LMT of the eNB. Once the network type of the eNB is identified, the UE may submit authentication data, as requested by any authentication procedures executed by the eNB prior to proceeding to step 605.

At step 605, once a maintenance network is determined at step 603, the access to the local maintenance terminal (LMT) of the eNB is received in the mobile computing device. In an embodiment, various functions of eNB maintenance and configuration may be thereafter be performed by the mobile computing device. These functions are described above with respect to step 505.

At step 607, the user of the mobile computing device may submit configuration parameters, or request maintenance operations through a graphical user interface of the mobile computing device and corresponding to the maintenance and configuration of the eNB. In an embodiment, the graphical user interface comprises a mobile-graphical user interface dedicated to reconfigure and perform maintenance operations on a eNB.

By providing a method for wireless configuration and maintenance of small-cell base transceiver stations, the base stations in difficult to reach locations may be accessed even when disconnected from an operator network through the emulation of certain functionality of cellular network components in the base transceiver station. By providing this accessibility, the capital and operational costs attributed to maintaining and configuring small cell base transceiver stations may be reduced significantly. Although the subject matter has been described in language specific to structural features and/or processological acts, it is to be understood that the subject matter defined in the appended claims is not necessarily limited to the specific features or acts described above. Rather, the specific features and acts described above are disclosed as example forms of implementing the claims.

What is claimed is:

1. An apparatus for providing wireless maintenance and configuration of a base transceiver station, the system comprising:
    a small cell base transceiver station comprising:
        a local maintenance terminal operable to prevent or allow access to maintenance and configuration functionality for the small cell base transceiver station;
        a mobile management entity emulator configured to perform an configuration process to determine an authorization of a mobile device to configure the base transceiver station;
        a packet data network gateway emulator;
        a serving gateway emulator; and
        a home subscriber server emulator,
    wherein the small cell base transceiver station is deployed in the field,
    wherein the small cell base transceiver station is operable to process wireless transmission according to a plurality of access classes, including a local maintenance class,
    further wherein wireless transmissions corresponding to the local maintenance class are processed locally within the base transceiver station.

2. The apparatus according to claim 1, wherein at least one of the mobile management entity emulator, the packet data network gateway emulator, the serving gateway emulator, and the home subscriber server emulator is implemented as a plurality of programmed instructions executed by a processor in the small cell base transceiver station.

3. The apparatus according to claim 1, wherein at least one of the mobile management entity emulator, the packet data network gateway emulator, the serving gateway emulator, and the home subscriber server emulator is implemented as a hardware component comprised in the small cell base transceiver station.

4. The apparatus according to claim 1, wherein at least one of the mobile management entity emulator, the packet data network gateway emulator, the serving gateway emulator, and the home subscriber server emulator is implemented as a plurality of programmed instructions executed by a processor comprised in the small cell base transceiver station.

5. The apparatus according to claim 1, wherein the mobile management entity emulator is configured to perform at least one of:
    a bearer activation/deactivation process;
    an attach/detach process;
    an authentication and key agreement process; and
    a security mode command process.

6. The apparatus according to claim 5, wherein bearer activation/deactivation process comprises activating a requesting mobile computing device as a default bearer.

7. The apparatus according to claim 6, wherein the packet data network gateway emulator is configured to provide an IP address for the default bearer.

8. The apparatus according to claim 5, wherein the authentication and key agreement process comprises using a plurality of authentication vectors.

9. The apparatus according to claim 8, wherein the plurality of authentication vectors are generated by the home subscriber server emulator.

10. The apparatus according to claim 1, wherein the maintenance and configuration functionality comprise at least one of:
- means for generating a summary view of a plurality of alarms corresponding to a plurality of zones corresponding to a mobile computing device communicating with the small cell base transceiver station through the local maintenance terminal;
- means for performing real-time monitoring of the small cell base transceiver station;
- means for managing a plurality of programmed instructions executing on the small-cell; and
- means for managing and initiating a plurality of self-diagnostic tests performed by the small cell.

11. The apparatus according to claim 1, wherein an access to the local maintenance terminal by a mobile computing device is performed through a graphical user-interface displayed in the mobile computing device.

12. A method for providing wireless maintenance and configuration of a base transceiver station, the method comprising:
- transmitting a wireless transmission from a mobile computing device to a small-cell base transceiver station;
- performing an authentication process to receive authorization for wireless access to configuration functionality of the base transceiver station;
- determining a network corresponding to the small-cell base transceiver station comprises a maintenance network;
- receiving wireless access to configuration functionality of the base transceiver station; and
- configuring the base transceiver station through a plurality of emulators, according to user-provided configuration and maintenance operations,
- wherein the small cell base transceiver station is operable to process wireless transmission according to a plurality of access classes, including a local maintenance class,
- further wherein wireless transmissions corresponding to the local maintenance class are processed locally within the base transceiver station.

13. The method according to claim 12, wherein the base transceiver station corresponds to a plurality of public land mobile networks.

14. The method according to claim 13, wherein the plurality of public land mobile networks comprises a maintenance network.

15. The method according to claim 14, wherein determining a network corresponding to the base transceiver station comprises receiving, from the base transceiver station, a mobile country code and a mobile network code corresponding to the maintenance network.

16. The method according to claim 12, wherein determining the wireless transmission corresponds to a maintenance connection comprises determining the wireless transmission corresponds to the local maintenance class.

17. The method according to claim 12, wherein the base transceiver station comprises the plurality of emulators, the plurality of emulators comprising:
- a mobile management entity emulator;
- a packet data network gateway emulator;
- a serving gateway emulator; and
- a home subscriber server emulator.

18. The method according to claim 12, wherein receiving wireless access comprises receiving access to via a graphical user-interface executing in the mobile computing device.

* * * * *